P. H. VANDEN BERG.
ALFALFA GATE.
APPLICATION FILED APR. 6, 1912.
1,092,187.
Patented Apr. 7, 1914.
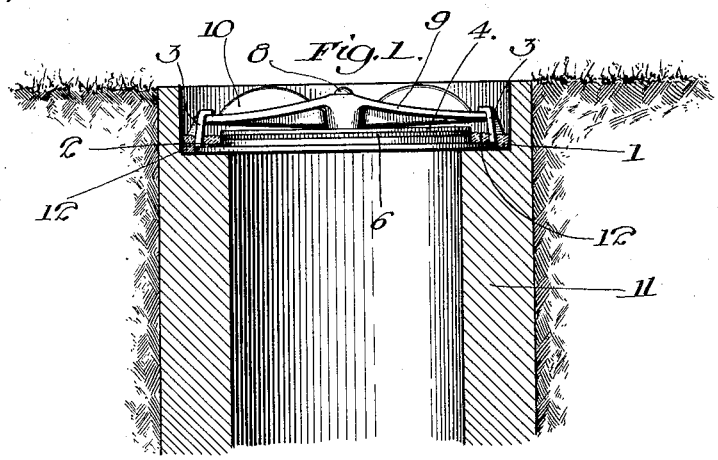
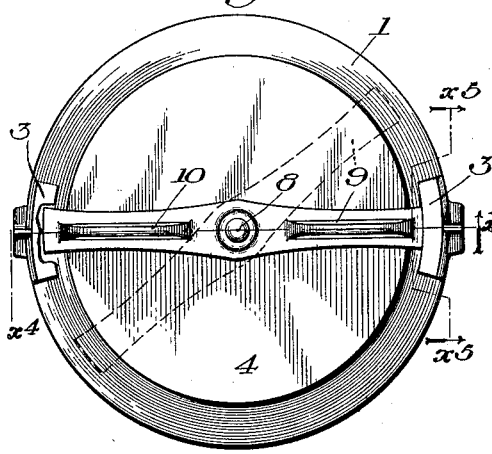
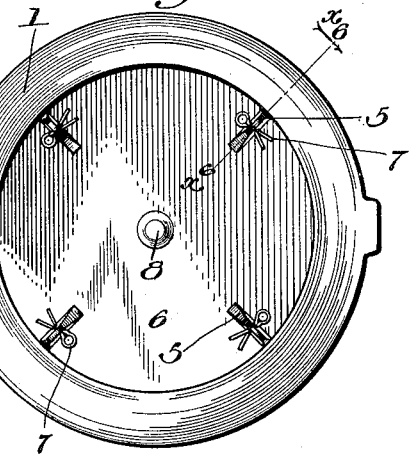
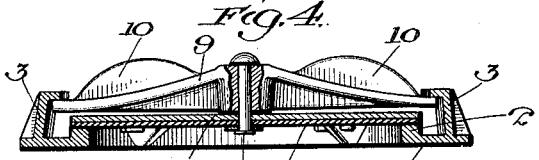
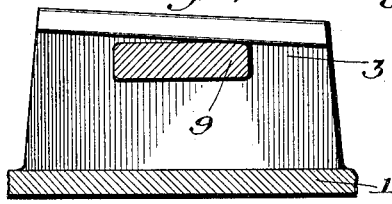
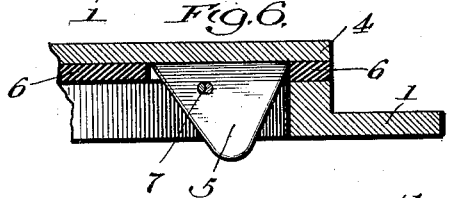
Witnesses:
Inventor:
Peter H. VandenBerg.

UNITED STATES PATENT OFFICE.

PETER HENRY VANDEN BERG, OF ONTARIO, CALIFORNIA, ASSIGNOR TO PACIFIC ELECTRIC HEATING COMPANY, OF ONTARIO, CALIFORNIA, A CORPORATION OF CALIFORNIA.

ALFALFA-GATE.

1,092,187.  Specification of Letters Patent.  Patented Apr. 7, 1914.

Application filed April 6, 1912. Serial No. 689,069.

*To all whom it may concern:*

Be it known that I, PETER H. VANDEN BERG, a citizen of the United States, residing at Ontario, in the county of San Bernardino and State of California, have invented a new and useful Alfalfa-Gate, of which the following is a specification.

This invention relates to a gate for controlling the flow of irrigating water onto fields of alfalfa or other product, and the object of the invention is to provide a gate which is of extreme simplicity, of economical construction, and great durability.

A further important object is to provide a gate which is so constructed that it does not present an obstacle above the ground and which may be walked over or driven over without injury.

Referring to the drawings: Figure 1 is a cross section through a pipe, showing the gate in place. Fig. 2 is a plan view. Fig. 3 is a bottom view. Fig. 4 is a section on line $x^4$—$x^4$ Fig. 2. Fig. 5 is a section on an enlarged scale on line $x^5$—$x^5$ Fig. 2. Fig. 6 is a section on an enlarged scale on line $x^6$—$x^6$ Fig. 3.

The gate comprises a ring 1, and a vertical flange 2. Projecting above the ring 1 are two locking lugs 3 arranged diametrically opposite each other.

4 is the cover which comprises a metal disk, preferably of cast metal, with depending lugs 5 adapted to engage the flange 2 to prevent the cover from being shifted off said flange. A rubber packing plate 6 is secured to the underside of the disk 4, the rubber plate 6 being cut out to receive the lugs 5 and a cotter pin 7 being passed through the lugs 5 to hold the rubber plate 6 in position. A bolt 8 passes through the disk 4 and rubber plate 6, and pivoted thereon is a locking lever 9, the ends of which are adapted to lock under the locking lugs 3, each locking lug 3, as clearly shown in Fig. 5, being constructed with a slight angle to cause the end of the lever 9 to securely wedge in place. The lever 9 has a pair of wings 10 by means of which it may be moved into or out of locking position. The lever may be easily operated by the foot, a kick against either of the wings 10 serving to lock or release the lever.

The rubber is firmly pressed against the vertical flange when the lever is in locked position, which prevents water passing upward through the gate. By releasing the lever 10 and lifting out the disk the water may flow out and overflow onto the land.

The gate is arranged in the upper end of the distributing pipe 11, and the gate will preferably be swung so that it is substantially flush with the surface of the ground, as shown in Fig. 1. The gate may be fixed in position by placing cement 12 over the ring 1.

What I claim is:

1. An alfalfa gate comprising a ring adapted to be secured to the distributing pipe, a pair of locking lugs projecting up from said ring, said ring having a vertical flange, a disk having depending lugs adapted to engage said flange to prevent the disk from being shifted off said flange, a packing plate on the underside of said disk, said depending lugs projecting through said plate, pins extending through said depending lugs for holding the plate against the disk, said plate adapted to bear against said vertical flange, and a lever pivoted to said disk and adapted to engage said locking lugs.

2. An alfalfa gate comprising a ring adapted to be secured to the distributing pipe, a pair of locking lugs projecting up from said ring, said ring having a vertical flange, a disk having depending lugs adapted to engage said flange to prevent the disk from being shifted off said flange, a packing plate on the underside of said disk, said depending lugs projecting through said plate, pins extending through said depending lugs for holding the plate against the disk, said plate adapted to bear against said vertical flange, and a lever pivoted to said disk and adapted to engage said locking lugs, wings projecting up from said lever on the opposite sides of the pivot thereof.

In testimony whereof, I have hereunto set my hand at Ontario, California, this 14th day of March, 1912.

PETER HENRY VANDEN BERG.

In presence of—
G. B. HARDING,
GEO. N. KNOX.

---

Copies of this patent may be obtained for five cents each, by addressing the "Commissioner of Patents, Washington, D. C."